United States Patent [19]
Rink et al.

[11] Patent Number: 6,130,308
[45] Date of Patent: Oct. 10, 2000

[54] BINDING AGENTS FOR POLYURETHANE-BASED PAINTS

[75] Inventors: Heinz-Peter Rink; Bernd Mayer, both of Münster; Egbert Nienhaus, Ascheberg, all of Germany

[73] Assignee: BASF Coating AG, Muenster-Hiltrup, Germany

[21] Appl. No.: 09/125,007

[22] PCT Filed: Jan. 15, 1997

[86] PCT No.: PCT/EP97/00149

§ 371 Date: Aug. 20, 1998

§ 102(e) Date: Aug. 20, 1998

[87] PCT Pub. No.: WO97/29142

PCT Pub. Date: Aug. 14, 1997

[30]   Foreign Application Priority Data

Feb. 10, 1996 [DE] Germany ............... 196 04 911

[51] Int. Cl.$^7$ ................................. C08G 18/62
[52] U.S. Cl. ................ 528/75; 525/123; 524/500; 524/539; 524/562; 524/591; 428/423.1; 428/425.8; 427/388.4
[58] Field of Search ............... 525/123; 524/539, 524/500, 562, 591; 528/75; 428/423.1, 425.8; 427/388.4

[56]   References Cited

U.S. PATENT DOCUMENTS 4,719,132   1/1988   Porter ............................ 427/409

FOREIGN PATENT DOCUMENTS

| 0 358 979 A2 | 8/1989 | European Pat. Off. | ......... C08G 18/62 |
| 0 622 378 A1 | 4/1994 | European Pat. Off. | ......... C08F 8/14 |
| 35 45 618 A1 | 12/1985 | Germany | ......... C09D 3/72 |
| 44 21 823 A1 | 6/1994 | Germany | ......... C09D 175/04 |
| 195 42 626 A1 | 11/1995 | Germany | ......... C09D 175/04 |

*Primary Examiner*—Rachel Gorr

[57]   ABSTRACT

The invention relates to coating compositions for the production of coatings which are resistant to condensed water and comprise binders based on a polyurethane resin PUR which comprises alpha, omega-polymethacrylatediols (A) as structural units. The alpha, omega-polymethacrylatediols (A) preferably consist of the monomer units methyl methacrylate, ethyl methacrylate, propyl methacrylate, n-butyl methacrylate, isobutyl methacrylate, tert-butyl methacrylate, n-pentyl methacrylate, amyl methacrylate, n-hexyl methacrylate, n-octyl methacrylate, 2-ethylhexyl methacrylate, n-decyl methacrylate, cyclopentyl methacrylate, cyclohexyl methacrylate, 4-tert-butylcyclohexyl methacrylate, cyclooctyl methacrylate, phenyl methacrylate or isobornyl methacrylate or mixtures thereof. The present invention additionally relates to processes for the preparation of such coating compositions and to their preferred use as fillers, basecoats and/or topcoats, especially in connection with automotive production-line finishing and/or refinishing.

27 Claims, No Drawings

BINDING AGENTS FOR POLYURETHANE-BASED PAINTS

FIELD OF THE INVENTION

The invention relates to a coating composition for the production of coatings which are resistant to condensed water, comprising binders based on polyurethane which contain alpha,omega-polymethacrylatediols as structural units. The novel coating compositions are preferably employed as fillers, basecoats, clearcoats and/or topcoats.

PRIOR ART

Conventional coating compositions, i.e. those dissolved in organic solvents, based on hydroxyl-containing binders and on crosslinking agents containing isocyanate groups are usually multicomponent systems. One component contains the binder, any pigments and fillers, and customary auxiliaries and additives, the other component contains the crosslinking agent. In addition, a standardizing additive consisting essentially of a mixture of different solvents is also prepared in order to establish the desired viscosity of the coating composition. For ecological and economic reasons, the coatings industry is continuing to make efforts to replace as large as possible a proportion of the organic solvents employed in coating materials by water. In automotive finishing, in particular, there is a great demand for aqueous coating materials. This applies both to the sector of automotive production-line finishing and to the sector of automotive refinishing.

In this context, aqueous coating compositions are employed in particular in the topcoats sector. Topcoats in this context refers to coating materials which are used to produce the topmost coat. This topmost coat can be single-layer or multilayer, especially two-layer. Two-layer topcoats consist of a pigmented basecoat and, applied thereto, a clearcoat which is not pigmented or is pigmented only with transparent pigments.

Two-coat finishes are nowadays produced by the wet-on-wet method, in which a pigmented basecoat is first applied, and the basecoat thus obtained is overcoated with a clearcoat, without a baking step, and then basecoat and clearcoat are cured together. This method is highly advantageous economically but places high requirements on the basecoat and the clearcoat. The clearcoat applied to the as yet uncured basecoat must not disrupt the basecoat, since otherwise finishes of poor appearance are obtained. This applies in particular to finishes for which basecoats containing special-effect pigments (for example metal pigments, especially aluminum flakes or pearlescent pigments) are employed. Furthermore, the topcoat compositions have to be able to be applied by spraying. For this purpose, they must have a solids content at spray viscosity which is high enough for paint films of adequate thickness to be obtained by one to three spray passes (cross-passes), and they must give baked films of good appearance (good evenness, high gloss, low tendency toward boil marks, good topcoat holdout and a high degree of hardness) and good weather resistance.

EP-B-0 358 979 discloses aqueous two-component polyurethane coating compositions comprising a hydroxyl-containing polyacrylate resin dispersed in water, and a polyisocyanate component. However, these coating materials described in EP-B-0 358 979 exhibit great disadvantages in terms of gloss, stretching (low grain in the coating), tendency toward boil marks and, as a consequence thereof, spray safety, and in terms of weathering resistance, especially in terms of the resistance in constant condensed-water conditions (40 degrees C, 240 hours), processibility (drop in viscosity and insufficient pot life) and hardness.

DE-A-44 21 823 describes three-component coating compositions which are characterized in that 1.) component (I) comprises as binder (A)
   (A1) at least one hydroxyl- and carboxyl-containing acrylate copolymer (A1) which is dissolved or dispersed in one or more organic, water-dilutable solvents and has a number-average molecular weight of between 1000 and 30,000, an OH number of from 40 to 200 mg of KOH/g and an acid number of from 5 to 150 mg of KOH/g, and/or
   (A2) at least one hydroxyl- and carboxyl-containing polyester resin (A2) which is dissolved or dispersed in one or more organic, water-dilutable solvents and has a number-average molecular weight of between 1000 and 30,000, an OH number of from 30 to 250 mg of KOH/g and an acid number of from 5 to 150 mg of KOH/g, and/or
   (A3) at least one hydroxyl- and carboxyl-containing polyurethane resin (A3) which is dissolved or dispersed in one or more organic, water-dilutable solvents and has a number-average molecular weight of between 1000 and 30,000, an OH number of from 20 to 200 mg of KOH/g and an acid number of from 5 to 150 mg of KOH/g, and,
   (A4) if desired, at least one further binder, the binders (A1) and/or (A2) and/or (A3) and, if desired, (A4) being selected such that a 50% strength solution of the binder (A) in ethoxyethyl propionate at 23° C. has a viscosity of $<=2.5$ dpa·s, 2.) component (II) contains as crosslinking agent (F) at least one nonblocked di- and/or polyisocyanate F1) which is, if desired, dissolved or dispersed in one or more organic solvents, and, if desired, at least one further crosslinking agent consisting of at least one epoxide compound (F2) having at least two epoxide groups per molecule and/or, if desired, at least one amino resin (F3), and 3.) component (III) is essentially binder-free and contains water.

DE-A-44 21 823 also relates to a process for preparing these coating compositions and to the use of the coating compositions in refinishing, for the coating of plastics and as a topcoat or filler.

In comparison with the coating compositions according to EP-B-0 358 979, the coating compositions according to DE-A-44 21 823 have improved gloss, improved stretching (low grain), lower tendency to show boil marks and, as a consequence thereof, better spraying safety and improved weather resistance (constant condensed-water conditions test).

The as yet unpublished German Patent Application 195 38 956.5 likewise describes three-component coating compositions whose components (I) and (II) are very similar to those of the coating compositions according to DE-A 44 21 823 but whose component (III) contains 10 the constituents (A1) to (A4) in aqueous dispersion as binder.

Using the coating compositions according to the unpublished German Patent Application 195 38 956.5 it is possible to produce coatings which, relative to DE-A-44 21 823, have improved gloss, an improved spraying safety and an improved leveling. However, there continues to be a need for improvement, especially in respect of improved adhesion of the coating, in particular after exposure to constant condensed-water conditions.

DE-A 35 45 618 describes waterborne coating materials consisting of aqueous dispersions, comprising as film-forming material at least one polyurethane resin having an acid number of from 5 to 70 mg of KOH/g which is prepared from an intermediate which contains isocyanate groups and also has polyether and/or polyester segments and which is subsequently reacted with polyols, preferably triols. The waterborne coating materials according to DE-A-35 45 618 are preferably employed as basecoats in the basecoat/clearcoat method, for example in he finishing of automobiles.

With coating materials according to DE-A-35 45 618 as well there is a need for improved adhesion to the subtrate, especially under condensed-water conditions.

P-A-0 622 378 discloses alpha, omega-polymethacrylatediols, processes for their preparation and their use for the preparation of polymers, especially polyurethanes and polyesters. The resulting polyurethanes and polyesters containing polymethacrylate blocks are described as block copolymers having particularly advantageous technical performance properties. The use of polyurethanes having further specific units, in addition to the polymethacrylate blocks, as binders for coating materials is not described by EP-A-0 622 378.

OBJECT AND ACHIEVEMENT

The object on which the present invention is based, therefore, was to provide coating compositions based on polyurethane which combine the advantages of the polyurethane coating compositions with an improved adhesion of the coating to a wide variety of substrates, especially under condensed-water conditions.

It has surprisingly been found that coating compositions comprising polyurethane resins PUR as binder, having alpha,omega-polymethacrylatediols (A) as monomer units, lead to coatings with markedly improved adhesion under condensed-water conditions compared to coating compositions containing polyurethane resins of the prior art as binder.

The novel coating compositions are preferably waterbased, and with particular preference are aqueous fillers, basecoats, clearcoats and/or topcoats.

The novel polyurethane resin PUR is preferably in the form of a hydroxyl- and carboxyl-containing polyurethane resin PUR which is dissolved or dispersed in water, has an OH number of from 20 to 200 mg of KOH/g and an acid number of from 5 to 150 mg of KOH/g.

In another embodiment of the invention, the novel polyurethane resin PUR is in the form of a hydroxyl- and carboxyl-containing polyurethane resin PUR which is dissolved or dispersed in one or more organic, water-dilutable solvents, has an OH number of from 20 to 200 mg of KOH/g and an acid number of from 5 to 150 mg of KOH/g.

Preferably, in addition to the novel polyurethane resin PUR, the coating compositions also contain further binders, such as, in particular, polyacrylate resins PAC and/or polyester resins PES, which preferably contain hydroxyl groups, and, as a further component, crosslinking agents containing isocyanate groups.

IMPLEMENTATION OF THE INVENTION

The Novel Polyurethane Resin Pur

As a component (A), essential to the invention, the polyurethane resins PUR comprise alpha, omega-polymethacrylatediols as described, for example, in EP-A-0 622 378. In accordance with EP-A-0 622 378 the alpha,omega-polymethacrylatediols can be obtained by reacting terminally hydroxy-functional polymethacry-lates, obtained by free-radical polymerization in the presence of a hydroxy-functional molecular weight regulator, with diols, with the addition of nonbasic transesterification catalysts which are known per se, in a molar ratio of polymethacrylate to diol of from 1:1 to 1:10.

Examples of preferred monomer units forming the polymethacrylate sequence of the terminally hydroxy-functional polymethacrylatediols are: methyl methacrylate, ethyl methacrylate, propyl methacrylate, n-butyl methacrylate, isobutyl methacrylate, tert-butyl methacrylate, n-pentyl methacrylate, amyl methacrylate, n-hexyl methacrylate, n-octyl methacrylate, 2-ethylhexyl methacrylate, n-decyl methacrylate, cyclopentyl methacrylate, cyclohexyl methacrylate, 4-tert-butylcyclohexyl methacrylate, cyclooctyl methacrylate, phenyl methacrylate, isobornyl methacrylate or other (meth)acrylates with (ar)alicyclic ester radicals or mixtures thereof. Exemplary of diols suitable for the transesterification reaction to give the polymethacrylatediols are: ethylene glycol, propane-1,2- and -1,3-diol, butane-1,2-, -1,3- and -1,4-diol, neopentylglycol, hexane-1,6-diol, octane-1,8-diol, decane-1,10-diol, dodecane-1,12-diol, cyclopentane-1,2-diol, cyclohexane-1,2- and -1,4-diol, diethylene glycol, triethylene glycol, polyethylene glycol, polypropylene glycol, polybutylene glycol, polyoxyethylene-polyoxypropylene-diols, 2,3-butene-1,4-diol, 1,2- and 1,4-dihydroxymethylbenzene.

In addition to the alpha,omega-polymethacrylatediols (A) it is possible to employ, in the novel polyurethane resin PUR, all starting materials which are suitable in the preparation of polyurethane-based coating compositions, such as, for example, polyols, isocyanates, chain extenders, reactive components capable of forming salts, and other auxiliaries. Such starting materials are known, and are described, for example, in the following documents: DE-A-26 24 442, DE-A-32 10 051, EP-A-0 355 433, DE-A-35 45 618, DE-A-38 13 866, DE-A-40 05 961, DE-A-41 10 520 and DE-A-40 13 546. For examples of suitable structural components of the polyurethane resins PUR, therefore, reference may be made to these documents.

The di- and/or polyols (D1) employed in addition to the alpha,omega-polymethacrylatediols (A) to prepare the polyurethane resins (PUR) can be low-molecular weight and/or high molecular weight.

In order to increase the hardness of the polyurethane resins PUR, low molecular weight di- and/or polyols (D1) can be employed. They have a molecular weight of from 60 up to about 400 daltons and may contain aliphatic, cycloaliphatic, araliphatic and/or aromatic groups.

In order to obtain a polyurethane resin PUR of high flexibility it is possible to employ saturated and/or unsaturated polyesterdiols and/or polyesterpolyols (D1) and/or polyetherdiols and/or polyetherpolyols (D1) having a number-average molecular weight Mn of from 400 to 5000 daltons. Polyesterdiols (D1) are prepared by esterifying organic dicarboxylic acids or their anhydrides with organic diols, or are derived from a hydroxycarboxylic acid or from a lactone. In order to prepare branched polyesterpolyols (D1) it is possible to a small extent to employ polyols or polycarboxylic acids having a higher functionality. Preference is given to the use of linear polyesterdiols (D1).

Examples which may be mentioned of polyetherpolyols (D1) are polyoxyalkylenepolyols, especially polyoxypropylene glycols having a number-average molecular weight Mn of from 300 to 3000 daltons.

As polyol component (D1) it is also possible to employ polyesterpolyols whose acid component consists at least in part of dimeric fatty acids. Systems of this kind are described, for example, in U.S. Pat. No. 4 423 179.

Furthermore, the polyol component (Dl) employed may for example be: polylactonediols and/or polylactonepolyols, alkyd-modified polyesterdiols and/or polyesterpolyols, polycarbonatediols and/or polycarbonatepolyols, and polyolefindiols and/or polyolefinpolyols.

The novel polyurethane resins PUR are prepared using, as typical multifunctional isocyanates (B), aliphatic, cycloaliphatic and/or aromatic polyisocyanates having at least 2 isocyanate groups per molecule. Owing to their good resistance to ultraviolet light, (cyclo)aliphatic diisocyanates (B) give products with a low tendency toward yellowing. The polyisocyanate component (B) required to form the polyurethane resins PUR may also comprise a proportion of polyisocyanates of higher functionality, provided no gelling is caused. Products which have proven suitable as triisocyanates (B) are those formed by trimerization or oligomerization of diisocyanates or by reaction of diisocyanates with polyfunctional compounds containing OH or NH groups. The mean functionality can be lowered if desired by adding monoisocyanates.

In order to prepare high-solids polyurethane resin solutions, use is made in particular of diisocyanates (B) of the general formula (1):

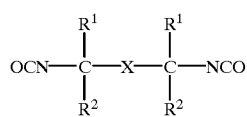

(1)

in which X is a divalent, aromatic hydrocarbon radical, preferably an unsubstituted, halogen-substituted, methyl-substituted or methoxy-substituted naphthylene, diphenylene or 1,2-, 1,3- or 1,4-phenylene radical, particularly preferably a 1,3-phenylene radical, and $R_1$ and $R_2$ are optionally different alkyl radicals having 1 to 4 carbon atoms, particularly preferably a methyl radical.

Diisocyanates of the formula (1) are known (their preparation is described, for example, in EP-A-0 101 832, U.S. Pat. No. 3,290,350, U.S. Pat. No. 4,130,577 and U.S. Pat. No. 4,439,616) and some are commercially available (1,3-bis(2-isocyanatoprop-2-yl)benzene, for example, is sold by the American Cyanamid Company under the trade name TMXDI (META)®).

In addition to the diisocyanates (B) of the formula (1) or instead of them it is also possible to employ other aliphatic and/or cycloaliphatic and/or aromatic polyisocyanates (B) as well. Examples of polyisocyanates (B) which can be employed in addition are 1,3- and 1,4-phenylene diisocyanate, 2,4- and 2,6-tolylene diisocyanate, xylylene diisocyanate, 4,4'-bisphenylene diisocyanate, 1,4- and 1,5-naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate.

Further preferred diisocyanate components (B) are diisocyanates of the formula (2):

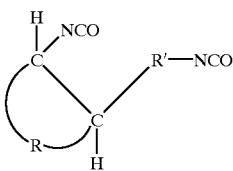

(2)

where: R is a divalent alkyl or aralkyl radical having 3 to 20 carbon atoms and

R' is a divalent alkyl or aralkyl radical having 1 to 20 carbon atoms.

The polyurethane resins PUR are in general not compatible with water unless specific constituents have been incorporated and/or particular preparation steps carried out in the course of their synthesis. Thus in order to prepare the preferred water-compatible polyurethane resins PUR, use can be made of compounds (C) containing two hydrogenactive groups, which react with isocyanate groups, and at least one group which ensures the dispersibility in water (carrier groups). Suitable carrier groups are nonionic groups (e.g. polyethers), anionic groups, mixtures of these two groups or cationic groups. For instance, the acid number incorporated into the polyurethane resin PUR can be so great that the neutralized product can be stably dispersed in water. This purpose is served by component (C), comprising compounds containing two hydrogenactive groups, which react with isocyanate groups, and at least one group capable of forming anions. Particularly suitable groups which react with isocyanate groups are hydroxyl groups and also primary and/or secondary amino groups. Groups capable of forming anions are carboxyl, sulfonic acid and/or phosphonic acid groups. Preference is given to the use of carboxylic or carboxylate groups. They should be so unwilling to react that the isocyanate groups of the diisocyanate (B) react preferentially with the other groups in the molecule which are reactive toward isocyanate groups. For this purpose, use is preferably made of alkanoic acids having 2 substituents on the alpha carbon atom. The substituent can be a hydroxyl group or an alkylol group. These polyols (C) have at least one, generally 1 to 3, carboxyl groups in the molecule. They have 2 to about 25, preferably 3 to 10, carbon atoms. The carboxyl-containing polyol (C) can make up from 0 to 25% by weight, preferably from 0 to 15% by weight, of the overall polyol constituent in the polyurethane resin PUR. The quantity of ionizable carboxyl groups available owing to the carboxyl group neutralization in salt form is in general at least 0.4% by weight, preferably at least 0.7% by weight, based on the solids. The upper limit is about 6% by weight. The quantity of dihydroxyalkanoic acids (C) in the unneutralized polyurethane resin PUR produces an acid number of at least 5, preferably at least 10. In the case of very low acid numbers, additional measures are generally necessary in order to achieve dispersibility in water. The upper limit of the acid number is at 70, preferably at 40, mg of KOH/g, based on the solids. The acid number is preferably in the range from 20 to 30 mg of KOH/g.

Examples of suitable components (C), containing at least 2 groups which react with isocyanate groups and at least one group capable of forming anions, are dihydroxypropionic acid, dimethylolpropionic acid, dihydroxysuccinic acid or dihydroxybenzoic acid. Also suitable are the polyhydroxy acids obtainable by oxidation of monosaccharin, for example glycolic acid, saccharic acid, mucic acid, glycuronic acid and the like.

Examples of amino-containing compounds (C) are alpha, delta-diaminovaleric acid, 3,4-diaminobenzoic acid, 2,4-diamino-5-toluenesulfonic acid, 4,4'-diaminodiphenyl ether sulfonic acid and the like.

In another embodiment of the invention, any isocyanate groups of the polyurethane resin PUR which is still present are reacted in a second stage with a modifying agent (D). This reaction, leads, in particular, to a further increase in the molecular weight of the polyurethane resin PUR. The quantity of this modifying agent (D) is determined by its functionality and by the isocyanate content of the polyurethane prepolymer. The ratio of equivalents of the active hydrogen atoms in the modifying agent (D) to the isocyanate groups in the prepolymer should generally be less than 4:1 and preferably in the range between 3:1 and 2:1.

Preferred modifying agents (D) employed for the reaction with the polyurethane prepolymer are di-, particularly preferably tri- and/or polyols (D1).

However, it is also possible to employ other compounds containing active hydrogen atoms as modifying agent (D), for example polyamines (D2), albeit only with the proviso that the reaction of the polyurethane prepolymer with the modifying agent (D) can be carried out (can be controlled) in the organic solvent and that, in the course of this reaction, there are no unwanted reactions, such as, for example, the gelling at the point of dropwise addition of the amine, as is frequently observed when using polyamines.

Compounds which may be mentioned by way of example of polyols (D1) containing at least 3 hydroxyl groups are trimethylolpropane, glycerol, diglycerol, 1,2,4-butanetriol, erythritol, mesoerythritol, arabitol, adonitol, et cetera. Preference is given to employing trimethylolpropane. The reaction of the prepolymer with the tri- and/or polyol (D1) is preferably controlled via the stoichiometry of the compounds employed such that chain extension occurs.

As soon as the polyurethane resin PUR has reached the desired molecular weight, which is preferably determined indirectly, using the viscosity of the solution of the polyurethane resin PUR in the solvent, then, in a preferred embodiment of the invention, the reaction is terminated by adding an additional component (E) containing an active hydrogen atom, in which any isocyanate groups still present in the polyurethane resin PUR are reacted with this component (E).

Component (E) is preferably a compound containing one hydroxyl group which is used for complete reaction of any isocyanate groups still present. Examples of such hydroxyl-containing components (E) which may be mentioned are: monoalcohols, such as ethanol, n-propanol, isopropanol or, preferably, n-butanol, or polyether monoalcohols, such as polyethylene glycol monoalkyl ethers or polypropylene glycol monoalkyl ethers.

The polyurethane resins PUR prepared by means of the novel process usually have a number-average molecular weight Mn of from 1000 to 30,000 daltons, preferably from 1500 to 20,000 daltons (determined in each case by gel permeation chromatography using polystyrene as standard), and, if appropriate, a hydroxyl number of from 20 to 200 mg of KOH/g, preferably from 25 to 150 mg of KOH/g, and, if appropriate, an acid number of from 5 to 150 mg of KOH/g, preferably from 10 to 100 mg of KOH/g.

In the case of the preferred water-compatible polyurethane resins PUR, the preparation of the polyurethane resin PUR in organic solution is followed by the addition of neutralizing agent in order to convert the acid groups into the acid anion groups. Neutralization can be carried out in the aqueous phase following the dispersion of the polyurethane resin PUR, or, preferably, in the organic solution of the polyurethane resin PUR prior to its dispersion in the aqueous phase. Preferred neutralizing agents are bases containing no active hydrogen atoms, such as tertiary amines, for example.

Examples of suitable tertiary amines for neutralizing the anionic groups are trimethylamine, triethylamine, dimethylaniline, diethylaniline, triphenylamine, dimethylethanolamine and the like. It is preferred to employ trimethylamine and/or dimethylethanolamine. In order to prepare the polyurethane resin dispersion, the solution of the polyurethane resin PUR is mixed with water in which, if appropriate, the abovementioned neutralizing agent is present.

In general, the quantity of water is calculated such that the polyurethane resin dispersions [lacuna] a solids content of up to 60% by weight, preferably from 10 to 60% by weight, particularly preferably from 10 to 50% by weight, based on the dispersion. The mean particle diameter of the dispersed polyurethane resin particles is in general below 1 micrometer, preferably between 10 and 500 nanometers. In the case of a very low content of hydrophilic groups, it is also possible to obtain mean particle diameters of between about 5 and 50 micrometers.

The novel polyurethane resins PUR preferably have the following composition of components (A) to (E):

from 1 to 80% by weight, particularly preferably from 5 to 65% by weight, of component (A), from 1 to 55% by weight, particularly preferably from 5 to 35% by weight of component (B), from 0 to 25% by weight, particularly preferably from 0 to 15% by weight of component (C), from 0 to 25% by weight, particularly preferably from 0 to 15% by weight of component (D), and from 0 to 50% by weight, particularly preferably from 0 to 20% by weight of component (E), the sum of components (A) to (E) making up 100% by weight of the polyurethane resin PUR.

THE OTHER BINDER COMPONENTS

In addition to the novel polyurethane resins PUR, the coating compositions can contain other binder components, preferably at least one polyacrylate resin PAC and/or at least one polyester resin PES, which are preferably in water-compatible form.

As polyacrylate resin binder component PAC it is preferred to employ acrylate copolymers according to DE-A-44 21 823, which are obtainable by polymerization, in an organic solvent or a solvent mixture and in the presence of at least one polymerization initiator, of a1) an essentially carboxyl-free (meth)acrylate which is different from (a2), (a3), (a4), (a5) and (a6) and is copolymerizable with (a2), (a3), (a4), (a5) and (a6), or a mixture of such monomers, a2) an ethylenically unsaturated monomer which is different from (a5), is copolymerizable with (a1), (a3), (a4), (a5) and (a6), carries at least one hydroxyl group per molecule and is essentially carboxyl-free, or a mixture of such monomers, a3) an ethylenically unsaturated monomer which carries at least one carboxyl group per molecule and is copolymerizable with (a1), (a2), (a4), (a5) and (a6) or a mixture of such monomers, and a4) if desired, one or more vinyl esters of alpha-branched monocarboxylic acids having 5 to 18 carbon atoms per molecule, and/or a5) if desired, at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which is then reacted, during or after the polymerization reaction, with the glycidyl ester of an alpha-branched monocarboxylic acid having 5 to 18 carbon atoms per molecule, a6) if desired, an essentially carboxyl-free, ethylenically unsaturated monomer which is copolymerizable with (a1), (a2), (a3), (a4) and (a5) and is different from (a1), (a2), (a4) and (a5), or a mixture of such monomers, the nature and quantity of (a1), (a2), (a3), (a4), (a5) and (a6) being selected such that the polyacrylate resin PAC has the desired OH number, acid number and the desired molecular weight.

Further preference is given to hydroxyl- and carboxyl-containing polyesters PES which are compatible with water, for example in accordance with DE-A-44 21 823, having the stated OH numbers, acid numbers and molecular numbers.

It is preferred to employ polyesters PES which are obtainable by reacting p1) polycarboxylic acids or esterifiable derivatives thereof, together, if desired, with monocarboxylic acids, p2) polyols, together, if desired, with monools, p3) if desired, further modifying components, and p4) if desired, a component which is reactive with the reaction product of (p1), (p2) and, if used, (p3).

Examples which may be mentioned of polycarboxylic acids which can be employed as component (p1) are aromatic, aliphatic and cycloaliphatic polycarboxylic acids. As component (p1) it is preferred to employ aromatic and/or aliphatic polycarboxylic acids. Examples of suitable polycarboxylic acids (p1) are phthalic acid, isophthalic acid, terephthalic acid, halophthalic acids, such as tetrachloro- or tetrabromophthalic acid, adipic acid, glutaric acid, acelaic [sic] acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid et cetera. The cycloaliphatic polycarboxylic acids (p1) can be employed both in their cis and in their trans form and as a mixture of both forms. Also suitable are the esterifiable derivatives of the abovementioned polycarboxylic acids (p1), such as, for example, their mono- or polyesters with aliphatic alcohols having 1 to 4 carbon atoms, or hydroxy alcohols having 1 to 4 carbon atoms. Furthermore, it is also possible to employ, where they exist, the anhydrides of the abovementioned acids.

Together with the polycarboxylic acids (p1), if desired, monocarboxylic acids can also be employed, such as, for example, benzoic acid, tert-butylbenzoic acid, lauric acid, isononanoic acid and fatty acids of naturally occurring oils. Isononanoic acid is preferably employed as monocarboxylic acid.

Suitable alcohol components (p2) for preparing the polyester PES are polyhydric alcohols, such as ethylene glycol, propanediols, butanediols, hexanediols, neopentyl hydroxypivalate, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, together, if desired, with monohydric alcohols, for example butanol, octanol, lauryl alcohol, ethoxylated and propoxylated phenols.

In a preferred embodiment of the invention the polyesters PES contain as alcohol component (p2) the abovedescribed alpha,omega-polymethacrylatediols in quantities of up to 100% by weight, based on (p2).

Compounds particularly suitable as component (p3) for preparing the polyesters PES are those having a group which is reactive toward the functional groups of the polyester, with the exception of the compounds mentioned as component (p4). As modifying component (p3) it is preferred to use polyisocyanates and/or diepoxide compounds, and also, if desired, monoisocyanates and/or monoepoxide compounds. Examples of suitable components (p3) are described in DE-A-40 24 204 on page 4, lines 4 to 9.

Compounds suitable as component (p4) for preparing the polyesters PES are those containing, in addition to a group which is reactive toward the functional groups of the polyester, a tertiary amino group as well, examples being monoisocyanates having at least one tertiary amino group or mercapto compounds having at least one tertiary amino group. For details, reference is made to DE-A-40 24 204, page 4, lines 10 to 49.

In addition it is possible for the polyacrylate resin PAC to have been prepared at least in part in the presence of the polyester PES. In this case, advantageously at least 20% by weight, and with particular advantage from 40 to 80% by weight, of the component PAC is prepared in the presence of the component PES. Any residual quantity of component PAC is added to the binder solution subsequently. In this context it is possible for this ready-polymerizable resin to have the same monomer composition as the polyacrylate resin PAC synthesized in the presence of the polyester PES. However, it is also possible to add a hydroxyl-containing polyacrylate resin PAC having a different monomer composition.

Suitable further binder components are all binders which are compatible with the other binders and are preferably dilutable in water, examples being acrylicized polyurethane resins and/or polyester acrylates.

The Coating Compositions

In one embodiment of the invention the novel coating compositions are physically drying one-component systems (component (I)) comprising the novel polyurethane resin PUR and, if desired, further binders, organic solvent and/or water, pigments if desired, neutralizing agents if desired, rheology-controlling additives if desired, and, if desired, other customary paint additives.

In this context the coating compositions can be organic-based (solventborne) and/or water-based.

To prepare the novel coating compositions it is preferred to employ components (I) which consist of (I1) from 20 to 90% by weight, preferably from 35 to 80% by weight, of the binder (I1), containing (optionally in the case of multicomponent coating compositions) the novel polyurethane resin PUR, (I2) from 0 to 60% by weight, preferably from 5 to 50% by weight, of at least one pigment and/or filler (I2), (I3) from 5 to 50% by weight, preferably from 10 to 40% by weight, of at least one organic, preferably water-dilutable solvent (I31) and/or water (I32), (I4) from 0 to 20% by weight, preferably from 0 to 10% by weight, of at least one optionally aqueous neutralizing agent (I4), (I5) from 0 to 5% by weight, preferably from 0 to 3% by weight, of at least one optionally aqueous rheology-controlling additive (I5), and (I6) from 0 to 20% by weight, preferably from 2 to 10% by weight, of at least one customary paint additive, the sum of the proportions by weight of components (I1) to (I6) being in each case 100% by weight, based on component (I).

In this context the component (I) preferably contains as binder (I1):

(I11) from 5 to 100% by weight (in the case of multicomponent coating compositions from 0 to 100% by weight), preferably from 10 to 90% by weight (in the case of multicomponent coating compositions from 0 to 90% by weight) of the novel polyurethane resin PUR, (I12) from 0 to 95% by weight, preferably from 5 to 85% by weight, of a polyacrylate PAC, (I13) from 0 to 30% by weight, preferably from 5 to 20% by weight, of at least one polyester PES, and (I14) from 0 to 50% by weight, preferably from 0 to 40% by weight, of at least one further binder, the sum of the proportions by weight of components (I11) to (I14) making up 100% by weight of the binder (I1).

As its constituent (I12), the component (I) can contain all customary paint pigments. In this context it is possible to employ both the pigments customary in aqueous coating compositions, which do not react with water and/or do not dissolve in water, and the pigments customarily employed in conventional coating compositions. The pigments can consist of inorganic or organic compounds and can provide color and/or a special effect. The novel coating composition therefore guarantees, owing to this large number of suitable pigments, a universal scope for use of the coating compositions, and enables the realization of a large number of color shades.

As special-effect pigments it is possible to employ metal flake pigments, such as commercial aluminum bronzes, aluminum bronzes chromated in accordance with DE-A-36 36 183, and commercial stainless steel bronzes, and also nonmetallic special-effect pigments, for example pearlescent pigments and interference pigments.

Examples of suitable inorganic color-imparting pigments are titanium dioxide, iron oxides, Sicotrans yellow and carbon black. Examples of suitable organic color-imparting pigments are Indanthrene blue, Cromophthal red, Irgazine orange and Heliogen green.

As its constituent (I3), component (I) contains at least one organic, preferably water-dilutable solvent and, if desired, further solvents (I31) and/or water (I32).

Examples of suitable solvents are, in particular, water-miscible solvents, for example alcohols, esters, ketones, keto esters, glycol ether esters and the like. Those preferably employed are esters, alcohols and glycol ethers, and with particular preference ethoxyethyl propionate and isopropoxypropanol.

As its constituent (I4), component (I) contains, if desired, at least one optionally aqueous neutralizing agent. Examples of suitable neutralizing agents are ammonia and amines, such as trimethylamine, triethylamine, tributylamine, dimethylaniline, diethylaniline, triphenylamine, dimethylethanolamine, diethylethanolamine, methyldiethanolamine and triethanolamine, and the like. Neutralization can be carried out in organic phase or in aqueous phase. A preferred neutralizing agent employed is dimethylethanolamine.

In the novel coating compositions, component (I) can contain at least one rheology-controlling additive as constituent (I5). Examples of rheology-controlling additives are: crosslinked polymeric microparticles, as disclosed for example in EP-A-0 038 127, inorganic phyllosilicates, for example aluminum-magnesium silicates, sodium magnesium phyllosilicates and sodium-magnesium-fluorine-lithium phyllosilicates of the montmorillonite type, and also synthetic polymers having ionic and/or associative groups, such as polyvinyl alcohol, poly(meth)acrylamide, poly (meth)acrylic acid, polyvinylpyrrolidone, styrene-maleic anhydride copolymers or ethylene-maleic anhydride copolymers and their derivatives, or else hydrophobically modified ethoxylated urethanes or polyacrylates. As rheology-controlling additives it is preferred to employ inorganic phyllosilicates.

Component (I) may in addition contain at least further customary paint additives as component (I6). Examples of such additives are defoamers, dispersion auxiliaries, emulsifiers, and leveling assistants.

In a preferred embodiment of the invention, the novel coating composition consists of component (I) and/or an aqueous component (III), in which case the novel polyurethane resin PUR is present in component (I) and/or in component (III), and, if desired, of a crosslinking component (II) and, if desired, of a further component (IV).

To prepare the novel coating compositions it is preferred to employ components (II) which consist of (II1) from 50 to 100% by weight, preferably from 60 to 90% by weight, of at least one crosslinking agent (II1), (II2) from 0 to 50% by weight, preferably from 10 to 40% by weight, of at least one organic, preferably water-miscible solvent (II2), and (II3) from 0 to 20% by weight, preferably from 0 to 10% by weight, of at least one customary auxiliary and/or additive (II3), the sum of the proportions by weight of components (II1) to (II3) being in each case 100% by weight, based on (II).

As crosslinking agent (II1), component (II) contains at least one preferably non-blocked di- and/or polyisocyanate (II11) which is optionally dissolved or dispersed in one or more organic, water-dilutable solvents, and also, if desired, at least one further crosslinking agent selected from at least one epoxide compound (II12) having at least two epoxide groups per molecule and/or at least one amino resin (II13).

The polyisocyanate component (II11) comprises any desired organic polyisocyanates having free isocyanate groups attached to aliphatic, cycloaliphatic, araliphatic and/or aromatic structures. Preference is given to employing polyisocyanates (II11) having 2 to 5 isocyanate groups per molecule and viscosities of from 100 to 2000 mPas (at 23 degrees C). If desired, even small quantities of organic solvent, preferably from 1 to 25% by weight based on the pure polyisocyanate, can be added to the polyisocyanates (II11) in order thus to improve the ease of incorporation of the isocyanate and, if desired, to reduce the viscosity of the polyisocyanate to a value within the abovementioned ranges. Solvents suitable as additives for the polyisocyanates (II11) are, for example, ethoxyethyl propionate, butyl acetate and the like.

Examples of suitable isocyanates (II11) are described, for example, in "Methoden der organischen Chemie", Houben-Weyl, Volume 14/2, 4th Edition, Georg Thieme Verlag, Stuttgart 1963, page 61 to 70, and by W. Siefken, Liebigs Ann. Chem. 562, 75 to 136. Examples of those suitable are the isocyanates mentioned in the description of the novel polyurethane resins PUR.

It is also possible to employ polyisocyanates (II11) having isocyanurate groups and/or biuret groups and/or allophanate groups and/or urethane groups and/or urea groups. Polyisocyanates (II11) containing urethane groups, for example, are obtained by reacting some of the isocyanate groups with polyols, for example trimethylolpropane and glycerol, for example.

It is preferred to employ aliphatic or cycloaliphatic polyisocyanates (II11), especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. Very particular preference is given to the use of mixtures of polyisocyanates (II11) which are based on hexamethylene diisocyanate and contain uretdione and/or isocyanurate groups and/or allophanate groups, as are formed by catalytic oligomerization of hexamethylene diisocyanate using appropriate catalysts. In addition, the polyisocyanate component (II11) may consist of any desired mixtures of the polyisocyanates mentioned by way of example.

The polyisocyanate component (II11) is advantageously employed in a quantity of at least 70% by weight, particularly preferably in a quantity of from 80 to 100% by weight, based on the overall weight of the crosslinking agent (II1).

Examples of suitable polyepoxides (II12) are all known aliphatic and/or cycloaliphatic and/or aromatic polyepoxides, for example based on bisphenol A or bisphenol F.

Examples of suitable components (II12) are also the polyepoxides commercially obtainable under the designations Epikote® from Shell, Denacol® from Nagase Chemicals Ltd., Japan, for example Denacol® EX-411 (pentaerythritol polyglycidyl ether), Denacol® EX-321 (trimethylolpropane polyglycidyl ether), Denacol® EX-512 (polyglycerol polyglycidyl ether) and Denacol® EX-521 (polyglycerol polyglycidyl ether). The polyepoxide component (II12) is employed in the novel coating compositions advantageously in a quantity of from 0 to 30% by weight, particularly preferably in a quantity of from 0 to 20% by weight, based on the overall weight of the crosslinking agent (II1).

Examples of suitable amino resins (II13) are iminofunctional melamine resins, such as the products commercially available under the name Cymel® 325 from Cyanamid and Luwipal® LR 8839 from BASF AG. The amino resin (II13) is employed in the novel coating compositions advantageously in a quantity of from 0 to 30% by weight, particularly preferably in a quantity of from 0 to 20% by weight, based on the overall weight of the crosslinking agent (II1).

In a further preferred embodiment of the invention, the novel coating compositions are prepared using a component (III) which consists of (III1) from 40 to 100% by weight, preferably from 50 to 95% by weight, of water, (III2) from 0 to 50 by weight, preferably from 5 to 45% by weight, of the binder component (I1) in water-dispersed form, (III3) from 0 to 20% by weight, preferably from 2 to 10% by weight, of at least one optionally aqueous neutralizing agent (I4), (III4) from 0 to 20% by weight, preferably from 2 to 10% by weight, of at least one customary auxiliary and/or additive (III4), and (III5) from 0 to 20% by weight, preferably from 0 to 10% by weight, of at least one emulsion polymer (III5), the sum of the proportions by weight of components (III1) to (III5) being in each case 100% by weight, based on (III).

In a preferred embodiment of the invention, the novel coating compositions are prepared using a further component (IV) which consists [sic] of a portion or of all of the auxiliaries and additives employed in the coating composition, dissolved and/or dispersed in organic solvent or, preferably, in aqueous phase.

To prepare the coating compositions, components (I), (II) and (III) are preferably employed in quantities such that the ratio of equivalents of hydroxyl groups of the binders (I1) and/or (III/2) to the crosslinking groups of the crosslinking agent (II1) is between 1:2 and 2:1, preferably between 1:1.2 and 1:1.5.

The novel coating compositions preferably have an overall binder content of from 10 to 50% by weight, preferably from 15 to 40% by weight, an overall crosslinking agent content of from 0 to 30% by weight, preferably from S to 20% by weight, an overall organic solvent content of from 5 to 60% by weight, preferably from 10 to 50% by weight, an overall water content of from 0 to 70% by weight, preferably from 25 to 60% by weight, an overall neutralizing agent content of from 0 to 10% by weight, preferably from 0 to 5% by weight, an overall pigment and/or filler content of from 0 to 50% by weight, preferably from 0 to 30% by weight, an overall emulsion polymer content of from 0 to 10% by weight, preferably from 0 to 5% by weight, and an overall content of customary paint additives and Theological auxiliaries of from 0 to 15% by weight, preferably from 0 to 10% by weight, in each case based on the overall weight of the coating composition.

Component (I) is prepared by methods known to the person skilled in the art by mixing and, if desired, dispersing the individual constituents. Thus the incorporation of color-imparting pigments, for example, is usually carried out by dispersing the respective pigments in one or more binders. The dispersing of the pigments is carried out with the aid of customary devices, such as bead mills and sand mills, for example.

The special-effect pigments are usually incorporated by homogeneous mixing of the special-effect pigments with one or more solvents. This mixture is then incorporated with stirring into a mixture of one or more of the above-described binders, with or without the addition of further organic solvents, using a stirrer or dissolver.

The optional components (II), (III) and (IV) are likewise prepared in accordance with methods well known to the person skilled in the art by mixing and/or dispersing the individual constituents.

In the preferred embodiments of the invention it is possible for the coating compositions to be prepared by all conceivable methods of mixing the components (I) (II), (III) and (IV). For the preparation of the coating compositions, components (I), (II), (III) and (IV) can be mixed and, if desired, dispersed up to 6 months prior to the application of the coating compositions.

For example, when preparing the preferred aqueous coating compositions it is possible first of all to mix components (I) and (II), in which case these components (I) and (II) preferably contain no neutralizing agent. Then, if desired, the aqueous component (IV) is added to this mixture. Then either the thus resulting mixture is added to the aqueous component (III), containing the neutralizing agent, and the coating composition obtained is dispersed, or the aqueous component (III) containing the neutralizing agent is added to the mixture thus obtained.

Furthermore, the preferred aqueous coating composition can be prepared, for example, in analogy to the method just described, but with the neutralizing agent not, however, being present in the aqueous component (III) but being added separately prior to the addition of the aqueous component (III).

The novel coating compositions can be applied to any desired substrates, for example metal, wood, plastic or paper, by customary application methods, for example by spraying, knifecoating, brushing or dipping.

When component (II) is present, the novel coating compositions are usually cured at temperatures below 160 degrees C, preferably at temperatures not more than 120 degrees C.

If the crosslinking component (II) is not present, then the novel coating compositions can be employed as physically drying systems, which are usually dried and/or cured at temperatures above room temperature.

The novel coating compositions are preferably employed for the production of topcoat finishes. The novel coating compositions can be employed both in the production-line finishing and the refinishing of car bodies. However, they are preferably employed in the refinish sector.

The novel coating compositions can be employed as fillers and to produce single-coat finishes, and also, preferably, as pigmented basecoats or as clearcoats in a method of producing a multicoat finish (basecoat/clearcoat) method.

The invention will now be illustrated in more detail with reference to working examples. All parts and percentages in these examples are by weight, unless expressly stated otherwise.

EXAMPLES

Example 1

Preparation and Application of a Single-component Physically Drying Pigmented Water-borne Paint 1.1. Preparation of the Novel Polyurethane (PUR) Binder Component (I11)

536.7 g of methyl ethyl ketone, 12.0 g of neopentyl glycol, 73.2 g of dimethylolpropionic acid, 369.2 g of m-tetramethylxylyl diisocyanate and 1554.8 g of a 79.5% strength solution of polymethyl methacrylatediol (Tegomer® BD 2000 from Goldschmidt AG) in methyl ethyl ketone are charged to a 4 l steel reactor which is suitable for the preparation of polyurethane resins, and this initial charge is heated to a reaction temperature of 82 degrees C. The reaction temperature is maintained until the isocyanate content is constant. Then 79.7 g of trimethylolpropane are added and, after no further reaction takes place, 830.6 g of butylglycol are metered in. The ethyl methyl ketone is then removed by vacuum distillation.

Finally, 39.1 g of N,N-dimethylethanolamine are added, and the mixture is stirred for 30 minutes and then adjusted with butylglycol to a solids content of 59.4%. The binder component (I11) has an acid number of 19.9 mg of KOH/g and a viscosity of 2.5 dPas (10:4 in N-methylpyrrolidone).

1.2 Comparison Example: Preparation of a Non-novel Polyurethane Binder Component (I11')

686.3 g of a polyester having a number-average molecular weight Mn of 1340 daltons prepared from 49.7 parts by weight of a commercial dimeric fatty acid (iodine number 10 mg of I2 [sic]/g, monomer content <0.1%, trimer content <2%, acid number from 195 to 200 mg of KOH/g and hydrolysis number from 197 to 202 mg of KOH/g), 20.1 parts by weight of isophthalic acid, 13.9 parts by weight of neopentyl glycol and 16.3 parts by weight of hexane-1,6-diol, is charged under inert gas to a 4 l steel reactor which is suitable for the preparation of polyurethane resins, and, in succession, 59.7 g of dimethylolpropionic acid, 9.8 g of neopentylglycol, 301.4 g of m-tetramethylenexylyl diisocyanate and 535.0 g of methyl ethyl ketone are added.

The mixture is heated under inert gas to a reaction temperature of 80 degrees C, which is maintained until the isocyanate content is constant.

Then 45.3 g of trimethylolpropane are added until no further reaction occurs (viscosity of the resin, 1:1 in N-methylpyrrolidone, 11 dpas) and 250 g of butoxyethanol are added. The methyl ethyl ketone is then removed by vacuum distillation.

Finally, 31.9 g of N,N-dimethylethanolamine are added and the mixture is stirred for 30 minutes and adjusted with butoxyethanol to a solids content of 60%.

The binder component (I11') has an acid number of 25.1 mg of KOH/g and a viscosity of 7.2 dPas (10:4 in N-methylpyrrolidone).

1.3. The Preparation of a Base Paint A or A' Containing the Binder Component (I11') or (I11') Respectively and the Pigment (I2)

27 parts by weight of an aluminum bronze chromated as in DE-A-36 36 183 (aluminum content 65%, average particle diameter 15 micrometers) are homogeneously distributed in 6.6 parts by weight of butylglycol (I3), 23.6 parts by weight of the binder component (I11) or (I11') and 13.6 parts by weight of isobutanol (I3) by stirring for 15 minutes, and the homogeneous dispersion is then run with stirring into 29.2 parts by weight of the binder component (I11) or, respectively, (I11'). These mixtures are stirred for a further 30 minutes with a high-speed stirrer at 1000 rpm.

This gives the base paints A (novel, containing binder component (I11)) and A' (comparison example, containing binder component (I11')).

1.4. The Rheology-controlling Additive (I5)

The Polyester Precursor 686.3 g of a polyester having a number-average molecular weight Mn of 1400 daltons, based on 54.2 parts by weight of a commercial dimeric fatty acid (iodine number: 10 mg of I2[sic]/g, a monomer content <0.1%, a trimer content <2%, an acid number of from 195 to 198 mg of KOH/g and a hydrolysis number of from 198 to 202 g of KOH/g), 16.0 parts by weight of isophthalic acid and 29.8 parts by weight of hexane-1,6-diol are charged under inert gas to an appropriate reaction vessel with stirrer, reflux condenser and feed vessels, and, in succession, 10.8 g of hexane-1,6-diol, 55.9 g of dimethylolpropionic acid, 303.6 g of bis (isocyanatocyclohexyl)methane and 344.9 g of methyl ethyl ketone are added.

This mixture is refluxed at 82 degrees C until the isocyanate content has fallen to 1.

Subsequently, 26.7 g of trimethylolpropane are added to the mixture and reflux is maintained until the viscosity is 12 dPas (resin solution in N-methylpyrrolidone=1:1).

Then 47.7 g of n-butanol are added for reaction of the excess isocyanate.

Subsequently, 32.7 g of N,N-dimethylethanolamine and 2688.3 g of deionized water are added to the reaction mixture with vigorous stirring.

After removal of the methyl ethyl ketone by means of vacuum distillation, the solids content of the dispersion is adjusted to 30% with water.

Preparation of the Rheoloqv-controlling Additive (I5)

To 33.2 parts by weight of the polyester precursor there are added, with stirring, 42 parts by weight of a pre-swollen paste containing 3% by weight of an inorganic sodium-magnesium phyllosilicate thickener (Laponite® from Laporte) and 3% by weight of polypropylene glycol having a number-average molecular weight Mn of 900 daltons (% by weight in each case based on the paste), 19.8 parts by weight of deionized water, 0.5 parts by weight of a commercial defoamer (Byk® 035 from Byk) and 3.5 parts by weight of a 3.5% strength solution of a commercial polyurethane thickener (Collacral® PU75 from BASF AG) in water.

1.5. Preparation and Application of the Waterborne Paint 19 parts by weight of the base paint A (novel) or A' (comparison example) are stirred into 81 parts by weight of the rheology-controlling additive (I5). The viscosity of the resulting waterborne paints WBL and, respectively, WBL' is adjusted to a flow time of about 25 sec in the DIN4 cup.

Directly after the preparation, the waterborne paints WBL and, respectively, WBL' are sprayed, in accordance with well-known methods of paint application, to steel panels (Bonder 132) coated with a commercial electrodeposition coating from BASF AG and a commercial filler (Glasurit® primer surfacer EP 801–1552 from Glasurit GmbH). The application of the waterborne paints WBL and, respectively, WBL' takes place at room temperature and 60% atmospheric humidity with a spray solids content of 17.85%.

Following a flash-off time of 30 minutes at room temperature (20 degrees C at 50% rel. atmospheric humidity), the waterborne-paint film is overcoated with a commercial 2-component clearcoat from BASF AG, based on a hydroxyl-containing polyacrylate and an isocyanate crosslinking agent, and the coats are dried at 60 degrees C for 30 minutes.

Table 1 Lists the Properties of the Multicoat Finish

TABLE 1

Properties of the waterborne paints WBL and WBL', containing base paint A (novel) and, respectively, A' (comparison)

| | Waterborne paint | |
| --- | --- | --- |
| Application data | WBL (novel) | WBL' (comparison) |
| Atmospheric humidity | 60% | 60% |
| pH | 7.69 | 7.55 |
| Spray viscosity (DIN4 cup) | 20 sec | 18 sec |

Adhesion Tests:
Crosshatch test according to DIN 53 151:
unexposed: Gt0 Gt0
240 Hours Under Condensed-water Conditions Followed by 24 Hours of Normal Storage:
Gt0–1F GT3F
Cross-cut test after steamjet treatment followed by 24 hours of normal storage (visual assessment: see also Table 2):

| satisfactory | unsatisfactory |
| --- | --- |
| m1/g1 | m2/g2–3 |
| m1/g1 | m1/g1 |

Example 2
Preparation and Application of an Aqueous 3-Component Clearcoat Comprising the Components (I), (II) and (III)

2.1. Preparation of Component (III) Containing the Novel Binder (I11)

2.1.1. Preparation of an Aqueous Dispersion of the Novel Polyurethane (PUR) Binder Component (I11) as Constituent of Component (III2)

405.2 g of methyl ethyl ketone, 6.6 g of butylethylpropane-1,3-diol, 69.1 g of dimethylolpropionic acid, 318.0 g of m-tetramethylxylyl diisocyanate and 1044.0 g of a 79.5% strength solution of polymethyl methacrylatediol (Tegomer BD 2000 from Goldschmidt AG) in methyl ethyl ketone are charged to a 4 l steel reactor which is suitable for the preparation of polyurethane resins, and this initial charge is heated to a reaction temperature of 82 degrees C. The reaction temperature is maintained until the isocyanate content is constant. Then 152.4 g of trimethylolpropane are added. After no further change in the isocyanate content occurs, 36.7 g of N,N-dimethylethanolamine are added and stirring is continued for 30 minutes more.

Then 1300.0 g of deionized water are metered in. After the end of the addition of water and homogenization, the methyl ethyl ketone is removed by vacuum distillation and the mixture is adjusted with deionized water to a solids content of 37%.

The homogeneous dispersion of the novel polyurethane resin binder (I11) has an acid number of about 23 mg of KOH/g and a pH 7.39. The dispersion is stable on storage at 40 degrees C for 8 weeks.

2.1.2 Comparison Example: Preparation of the Aqueous Dispersion of a Non-novel Polyurethane Binder Component (I11') as Constituent of Component (III2')

Preparation of the Polyester Precursor 1088.0 g of neopentylglycol hydroxypivalate, 120.0 g of phthalic anhydride, 1268.0 g of isophthalic acid, 21.0 g of 2,2-butylethylpropane-1,3-diol, 489.0 g of neopentylglycol and 113.0 g of xylene are weighed into a 4 l steel reactor which is suitable for polycondensation reactions.

The mixture is then heated and the water of condensation is removed continuously until the acid number is 3.5 mg of KOH/g.

Finally, ethyl ethoxypropionate is used to establish a solids content of 79.7%.

The acid number of the polyester precursor is 4.4 mg of KOH/g and the viscosity is 3.6 dPas (60% strength in ethyl ethoxypropionate).

Preparation of the Non-novel Polyurethane Resin I11'

749.0 g of the polyester precursor, 6.6 g of ethylbutylpropanediol 69.0 g of dimethylolpropionic acid and 318.0 g of m-tetramethylenexylyl diisocyanate are charged to a 4 l steel reactor which is suitable for the preparation of polyurethane resins.

The mixture is heated to a reaction temperature of 110 degrees C and is maintained until the isocyanate content is constant.

Then 101.0 g of trimethylolpropane are added in a single portion and the mixture is heated until no further reaction occurs.

Then 31.5 g of ethyl ethoxypropionate are added.

After stirring for 30 minutes, neutralization is carried out with 36.7 g of N,N-dimethylethanolamine. The resulting reaction mixture is dispersed at from 90 to 110 degrees C into 1929.2 g of hot water (water temperature 60 degrees C).

The resulting dispersion of the non-novel polyurethane resin binder (I11') is homogeneous, has a solids content of 36.1%, an acid number of 30.3 mg of KOH/g and a pH of 7.1.

The dispersion is stable on storage at 40 degrees C for more than 4 weeks.

2.1.3. Preparation of the Aqueous Dispersion of the Polyacrylate (PAC) Binder Component (112) as Constituent of Component (II2) and, Respectively, (III2')

385 parts by weight of ethyl ethoxypropionate are charged to a steel vessel fitted with monomer feed, initiator feed, thermometer, oil heating and reflux condenser, and are heated to 110 degrees C. A solution of 68 parts by weight of tert-butyl peroxyethylhexanoate in 159 parts by weight of n-butanol is then added at a rate such that the addition is over after 5.5 hours. Commencement of the addition of the tert-butyl peroxyethylhexanoate solution is simultaneous with the commencement of the addition of the monomer mixture (first monomer feed stream) comprising (a1) (a2) and (a6):

(a1): 255 parts by weight of n-butyl methacrylate,
197 parts by weight of methyl methacrylate,
113 parts by weight of lauryl acrylate,
(commercial product Methacrylester 13 from Röhm GmbH, Darmstadt),
(a2): 215 parts by weight of hydroxyethyl acrylate and
(a6): 181 parts by weight of styrene.

The mixture (a1), (a2) and (a6) is added at a rate such that the addition is over after 5 hours.

3.5 hours after beginning the first monomer feed, the addition (second monomer feed stream) of:
(a2): 113 parts by weight of hydroxyethyl acrylate and
(a3): 58 parts by weight of acrylic acid
is commenced.

The second monomer feed is over after 1.5 hours in conjunction with the first monomer feed.

After the end of the addition of the tert-butyl peroxyethylhexanoate solution, which is concluded 30 minutes after the end of the monomer feeds, a further 0.3% by weight of initiator solution is added, based on the amount employed in the feed stream, and the reaction mixture is held at 120 degrees C for 2 hours more.

Then, at 80 degrees C, 63 parts by weight of N,N-dimethylethanolamine (degree of neutralization 85% based on the quantity of acrylic acid (a3) employed) and 1338 parts by weight of water are added and the mixture is stirred for 30 minutes.

The organic solvent is then removed by distillation under vacuum down to <3%.

Finally, water is used to establish a solids content of 36.5%.

The pH of the resulting polyacrylate (PAC) dispersion is 6.97 and the acid number is 45.6 mg of KOH/g.

2.1.4. Preparation of Components (III) and (III'), Containing the Novel Polyurethane Resin PUR (Component (I11)) and, Respectively, the Non-novel Polyurethane Resin (component (I11'))

8.5 parts by weight of the aqueous dispersion of the novel polyurethane resin binder component (I11) according to Example 2.1.1. or 8.5 parts by weight of the aqueous dispersion of the non-novel polyurethane resin binder component (I11') according to Example 2.1.2. are mixed with 18.5 parts by weight of the aqueous polyacrylate (PAC) dispersion ((I12): 35% solids content) according to Example 2.1.3. to give the component (III2) and, respectively, (III2').

27.0 parts by weight of component (III2) or (III2') are mixed with 31.0 parts by weight of water (component III1)), 0.5 parts by weight of N,N-dimethylethanolamine (component (III3)) and 2.0 parts by weight of thickener (Dapral® T210 from AKZO: component (III4)).

This gives the novel component (III) and, respectively, the non-novel component (III').

2.2. Preparation of Component (I') Containing no Novel Polyurethane Resin PUR

2.2.1. Preparation of a Further Polyacrylate (PAC) Binder Component (112) as Component (I1)

25.00 kg of ethyl ethoxypropionate are charged to a 100 kg steel vessel fitted with monomer feed, initiator feed, thermometer, oil heating and reflux condenser, and the initial charge is heated to 130 degrees C. Then a solution of 2.7 kg of tert-butyl peroxyethylhexanoate in 4.1 kg of n-butanol is added at a rate such that the addition is over after 4.5 hours. 5 minutes after beginning the addition of the tert-butyl peroxyethylhexanoate solution, the addition is also begun of the monomer mixture (first monomer feed stream) comprising (a1), (a2) and (a6)

(a1): 7.13 kg of n-butyl methacrylate
5.72 kg of methyl methacrylate
3.16 kg of lauryl acrylate
(commercial product Methacrylester 13 from Röhm GmbH, Darmstadt),
(a2): 6.76 g of hydroxyethyl acrylate and
(a6): 5.96 kg of styrene.

The mixture (a1), (a2) and (a6) is added at a rate such that the addition is over after 4 hours.

2.5 hours after beginning the first monomer feed, the addition (second monomer feed stream) is begun of:
(a2) 2.80 kg of hydroxyethyl acrylate and
(a3) 1.36 kg of acrylic acid
in 0.68 kg of ethyl ethoxypropionate.

The second monomer feed is over after 1.5 hours in conjunction with the first monomer feed.

After the end of the addition of the tert-butyl peroxyethylhexanoate solution, which is over 25 minutes after the end of the monomer feeds, a further 0.3% by weight of initiator solution, based on the quantity employed in the feed, is added and the reaction mixture is held at 130 degrees C for 1 hour more.

By distilling off part of the ethyl ethoxypropionate, a polyacrylic resin (PAC) solution (I12) is obtained with a solids content of 79.2%, an acid number of 31.1 mg of KOH/g and a viscosity of 4.4 dPas (55% strength solution in ethyl ethoxypropionate).

2.2.2. Preparation of Component (I') Containing no Novel Polyurethane Resin PUR 14.4 parts by weight of the polyacrylate (PAC) binder component (I1) with a solids content of 80% are mixed with a solvent mixture (component (I3)) of 3.2 parts by weight of butyl glycol acetate and 3.0 parts by weight of butylglycol. To this mixture is added as component (I4) a mixture of 1.0 parts by weight of a wetting agent (Tensid® S from Biesterfeld), 0.2 parts by weight of a slip additive (Byk® 331 from Byk) and 0.2 parts by weight of additive based on a polysiloxane polyether copolymer (Tegoflow® 425 from Goldschmidt AG) dissolved in 0.4 parts by weight of methoxypropyl acetate.

This gives component (I').

2.3. Preparation of Component (II)

The constituents indicated below are mixed using a stirrer (600 revolutions per minute) to prepare the component (II):
2.9 Parts by Weight of Polyisocyanate Based on Hexamethylene Diisocyanate Allophanate (Desmodur® VPLS 2102 from Bayer AG),
10.7 Parts by Weight of Polyisocyanate Based on Hexamethylene Diisocyanate Trimer (Tolonate® HDTLV from Rhone-Poulenc) and
1.6 Parts by Weight of Ethyl Ethoxypropionate.

2.4. Preparation and Application of the Novel Aqueous 3-component Clearcoat KL and of the Non-novel Aqueous 3-component Clearcoat KL'

Shortly before the application of the clearcoat, 15.2 parts by weight of component (II) according to Example 2.3. are first of all added with intense stirring to 22.4 parts by weight of component (I). This mixture is then mixed intensively with 59.8 parts of component (III) or (III').

This gives the clearcoat KL, containing the novel component (III) with the polyurethane resin PUR, and the clearcoat KL', containing the non-novel component (III') without the polyurethane resin PUR.

The substrate used for the novel aqueous 3-component clearcoat are phosphated steel panels which were first of all coated with a commercial filler (Glasurit® primer surfacer EP 801–1552 from Glasurit GmbH) by spray application, dried at 80 degrees C for 45 minutes and at room temperature for 16 hours (dry film thickness 40 to 60 micrometers) and wet-sanded with sandpaper 800 and an eccentric sander. A basecoat comprising a mixture of 80 parts by weight of a commercial metallic basecoat (basecoat AE 54 M 99/9, base color Aluminium superfein, from Glasurit GmbH based on a hydroxyl-containing polyester, cellulose acetobutyrate and a melamine resin) and 20 parts by weight of a further commercial basecoat (basecoat AE 54 M 552, base color Helioblau, from Glasurit GmbH based on a hydroxyl-containing polyester, cellulose acetobutyrate, wax and a melamine resin) is applied to the filler coat, by first applying one spray pass and, after an intermediate flash-off time of 5 minutes, applying a second spray pass (spray pressure in each case 4 to 5 bar). After another flash-off time of 30 minutes, the 3-component clearcoat KL or KL', produced as described above, is applied, first of all applying one spray pass and, after an intermediate flash-off time of 10 minutes, applying a second and third spray pass (spray pressure in each case 4 to 5 bar).

Basecoat and clearcoat KL or KL' are cured together for 30 minutes at a temperature of 60 degrees C. The dry film thickness of the basecoat is from 10 to 20 micrometers. The dry film thickness of the clearcoat KL or KL' is from 50 to 80 micrometers.

This multicoat system, with the novel clearcoat KL or the non-novel clearcoat KL' as topcoat, is first of all aged for 5 days and then subjected to a water spray test, in which the test panels are sprayed with distilled water in a closed chamber at 20 degrees C for 5 minutes per hour for a period of 23 hours in one cycle. The cycle includes a 1-hour period for intermediate assessment and, correspondingly, lasts 24 hours.

Following the water spray test, the following tests are carried out on the test panels:

1. Visual assessment of the alteration to the metallic effect (0=unaltered to 5=very greatly altered).
2. Crosshatch test on the clearcoat film according to DIN 53 151
3. Visual assessment of a cross-cut on the clearcoat film KL or KL' after exposure of the cross-cut to a jet of steam with a pressure of 80 bar which was directed onto the cross-cut from a distance of 5 cm and at an angle of 90 degrees for 5 seconds (0=no alteration to 5=very great alteration of the cut edges)

TABLE 2

Testing of the clearcoat films KL and KL'

| Test | Clearcoat KL | Clearcoat KL' |
| --- | --- | --- |
| Optical alteration of the metallic effect after 10 cycles | 3 | 4 |
| Crosshatch test according to DIN 53 151 after 10 cycles | Gt0 | Gt1–2 |
| Cross-cut test after 10 cycles | 0 | 5 |

What is claimed is:

1. An aqueous coating composition for the production of coatings which are resistant to condensed water, comprising a binder comprising a polyurethane resin PUR comprising alpha, omega-polymethacrylatediols (A) as structural units.

2. The aqueous coating composition of claim 1, characterized in that the polyurethane resin PUR has a number-average molecular weight Mn of between 1000 and 30,000 dalton, a hydroxyl number of between 20 and 200 mg of KOH/g and, an acid number of between 5 and 150 mg of KOH/g.

3. The aqueous coating composition of claim 1, characterized in that the alpha, omega-polymethacrylatediols (A) are composed of monomer units selected from the group consisting of methyl methacrylate, ethyl methacrylate, propyl methacrylate, n-butyl methacrylate, isobutyl methacrylate, tert-butyl methacrylate, n-pentyl methacrylate, amyl methacrylate, n-hexyl methacrylate, n-octyl methacrylate, 2-ethylhexyl methacrylate, n-decyl methacrylate, cyclopentyl methacrylate, cyclohexyl methacrylate, 4-tert-butylcyclohexyl methacrylate, cyclooctyl methacrylate, phenyl methacrylate, isobornyl methacrylate and mixtures thereof.

4. The aqueous coating composition of claim 1, characterized in that the polyurethane resin PUR is comprised of:

A) from 1 to 80% by weight of the polylmethacrylatediol (A),

B) from 1 to 55% by weight of an isocyanate (B) selected from the group consisting of a diisocyanate, a polyisocyanate, and mixtures thereof, C) from 0 to 25% by weight of a component (C) which contains at least 2 groups which react with isocyanate groups and at least one group capable of forming anions, D) from 0 to 25% by weight of a modifying agent selected from the group consisting of an alcohol (D1), a polyamine (D2), and mixtures thereof, wherein the alcohol (D1) is selected from the group consisting of diols, polyols, and mixtures thereof, and wherein the components (D1) and (D2) are different from the component (C), and E) from 0 to 50% by weight of a component (E) containing an active hydrogen atom, the sum of components (A) to (E) making up 100% by weight of the polyurethane resin PUR.

5. The aqueous coating composition of claim 4, comprising a diisocyanate (B) of the general formula (1)

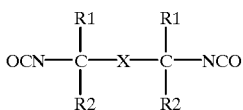

in which:

x is a divalent, aromatic hydrocarbon radical, and

R1 and R2 are alkyl radicals having 1 to 4 carbon atoms.

6. The aqueous coating composition of claim 1, comprising at least one further binder selected from the group consisting of polyacrylate resin PAC, polyester resin PES, and mixtures thereof.

7. The aqueous coating composition of claim 6, characterized in that the polyacrylate resin PAC is obtained by polymerization, in at least one organic solvent and in the presence of at least one polymerization initiator, of a1) an essentially carboxyl-free (meth)acrylate which is different from (a2), (a3), (a4), (a5) and (a6) and is copolymerizable with (a2), (a3), (a4), (a5), (a6), or a mixture of such monomers, a2) an ethylenically unsaturated monomer which is different from (a5), is copolymerizable with (a1), (a2), (a3), (a4), (a5), and (a6), carries at least one hydroxyl group per molecule and is essentially carboxyl-free, or a mixture of such monomers, a3) an ethylenically unsaturated monomer which carries at least one carboxyl group per molecule and is copolymerizable with (a1), (a2), (a3), (a4), (a5), (a6), or a mixture of such monomers, and a4) optionally, one or more vinyl esters of alpha-branched monocarboxylic acids having 5 to 18 carbon atoms per molecule, and/or a5) optionally, at least one reaction product of acrylic acid and/or methacrylic acid with the glycidyl ester of an alpha-branched mono-carboxylic acid having 5 to 18 carbon atoms per molecule or, instead of the reaction product, an equivalent quantity of acrylic acid and/or methacrylic acid which is then reacted, during or after the polymerization reaction, with the glycidyl ester of an alpha-branched monocarboxylic acid having 5 to 18 carbon atoms per molecule, a6) optionally, an essentially carboxyl-free, ethylenically unsaturated monomer which is copolymerizable with (a1), (a2), (a3), (a4), (a5), or a mixture of such monomers, and is different from (a1), (a2), (a4), or (a5), the nature and quantity of (a1), (a2), (a3), (a4), (a5) and (a6) being selected such that the polyacrylate resin PAC has an OH number of from 40 to 200 mg KOH/g, an acid number of from 5 to 150 mg KOH/g and a number average molecular weight of from 1000 to 30000.

8. The coating composition of claim 6, characterized in that the polyester resin PES is obtained by reacting p1) at least one polycarboxylic acid or esterifiable derivatives thereof, and optionally, one or more monocarboxylic acids, p2) at least one polyol, and optionally one or more monools, p3) optionally, further modifying components which are different from component (p4) and have at least one group reactive toward the functional groups of the polyester resin PES, and p4) optionally, a component which is reactive with the reaction product of (p1), (p2), and, if used, (p3).

9. The aqueous coating composition of claim 1, characterized in that the coating composition is composed of a component selected from the group consisting of component (I), an aqueous component (III) and mixtures thereof, at least one of said component (I) and said component (III) comprising the polyurethane resin PUR and, optionally, the coating composition further comprising an additional component selected from the group consisting of a crosslinking component (II), a component (IV) containing some or all of the auxiliaries and additives employed in the coating composition, and mixtures thereof.

10. The aqueous coating composition of claim 9, characterized in that component (I) is composed of (I1) from 20 to 90% by weight, of a binder (Iβ), (I2) from 0 to 60% by weight, of at least one additive (I2) selected from the group consisting of pigment, filler, and mixtures thereof, (I3) from 5 to 50% by weight, of at least one solvent (I3) selected from the group consisting of organic solvent, water-dilutable solvent (I31), water (I32), and mixtures thereof, (I4) from 0 to 20% by weight, of at least one aqueous neutralizing agent (I4), (I5) from 0 to 5% by weight, of at least one aqueous rheology-controlling additive (I5), and (I6) from 0 to 20% by weight, of at least one customary paint additive, the sum of the proportions by weight of components (Iβ) to (I6) being in each case 100% by weight, based on component (I); and the binder (I1) is comprised of (I11) from 0–100% by weight of the novel polyurethane resin, (I12) from 0 to 95% by weight of a polyacrylate PAC, (I13) from 0 to 30% by weight of at least one polyester PES, and (I14) from 0 to 50% by weight of at least one further binder, the sum of the proportions by weight of components (I11) to (I14) making up 100% by weight of the binder (I1).

11. The aqueous coating composition of claim 9, characterized in that the crosslinking component (II) comprises at least one isocyanate (II1) selected from the group consisting of diisocyanate, polyisocyanate, and mixtures thereof, and optionally, at least one further crosslinking agent selected from the group consisting of at least one epoxide compound (II12) having at least two epoxide groups per molecule, at least one amino resin (II13), and mixtures thereof.

12. The coating composition of claim 9, characterized in that component (III) is comprised of:

(III1) from 40 to 100% by weight, of water, (III2) from 0 to 50% by weight, of the binder component (I) in water-dispersed form, optionally containing the novel polyurethane resin PUR (I11), (III3) from 0 to 20% by weight, of at least one neutralizing agent (I4), (III4) from 0 to 20% by weight, of at least one customary auxiliary and/or additive (III4), and (III5) from 0 to 20% by weight, of at least one emulsion polymer (III5), the sum of the proportions by weight of components (III1) to (III5) being in each case 100% by weight, based on (III) ); and the binder (I1) is comprised of (I11) from 0–100% by weight of the novel polyurethane resin, (I12) from 0 to 95% by weight of a polyacrylate PAC, (I13) from 0 to 30% by weight of at least one polyester PES, and (I14) from 0 to 50% by weight of at least one further binder, the sum of the proportions by weight of components (I11) to (I14) making up 100% by weight of the binder (I1).

13. A process for preparing aqueous coating compositions according to claim 9, characterized in that the components are mixed up to 6 months prior to the application of the coating composition.

14. The process of claim 13 further comprising first mixing components (I) and (II) adding optional component (IV), and mixing the resulting mixture with the aqueous component (III).

15. A process of applying an aqueous coating composition to a substrate, comprising providing a coating composition of claim 1, and applying the coating composition to a substrate.

16. The process of claim 15 wherein the substrate is a previously coated automotive substrate.

17. The aqueous coating composition of claim 5 wherein x is a divalent aromatic hydrocarbon radical selected from the group consisting of an unsubstituted naphthylene diphenylene, an unsubstituted 1,2-phenylene radical, an unsubstituted 1,3-phenylene radical, or an unsubstituted 1,4-phenylene radical, a halogen-substituted naphthylene diphenylene, a halogen-substituted 1,2-phenylene radical, a halogen-substituted 1,3-phenylene radical, a halogen-substituted 1,4-phenylene radical, a methyl-substituted napthylene dephemylene, a methyl-substituted 1,2-phenylene radical, a methyl substituted 1,3-phenylene radical, a methyl substituted 1,4-phenylene radical, a methoxy-substituted naphthylene diphenylene, a methoxy-substituted 1,2-phenylene radical, a methoxy substituted 1,3-phenylene radical, and a methoxy substituted 1,4-phenylene radical.

18. The aqueous coating composition of claim 10, characterized in that component (I) is composed of (I1) from 35 to 80% by weight, of a binder (I1), (I2) from 5 to 50% by weight, of at least one additive (I2) selected from the group consisting of pigment, filler, and mixtures thereof, (I3) from 10 to 40% by weight, of at least one solvent (I3) selected from the group consisting of organic solvent, water-dilutable solvent (I31), water (I32), and mixtures thereof, (I4) from 0 to 20% by weight, of at least one aqueous neutralizing agent (I4), (I5) from 0 to 5% by weight, of at least one aqueous rheology-controlling additive (I5), and (I6) from 0 to 20% by weight, of at least one customary paint additive, the sum of the proportions by weight of components (I1) to (I6) being in each case 100% by weight, based on component (I).

19. The aqueous coating composition of claim 10, characterized in that the binder (I1) is comprised of (I11) from 0 to 90% by weight of the novel polyurethane resin PUR, (I12) from 5 to 85% by weight, of a polyacrylate PAC, (I13) from 5 to 20% by weight, of at least one polyester PES, and (I14) from 0 to 40% by weight, of at least one further binder, the sum of the proportions by weight of components (I11) to (I14) making up 100% by weight of the binder (I1).

20. The aqueous coating composition of claim 11, wherein crosslinking agent (II1) comprises a non-blocked isocyanate (II11) selected from the group consisting of diisocyanate, polyisocyanate, and mixtures thereof.

21. The aqueous coating composition of claim 20, wherein crosslinking agent (II1) is dissolved or dispersed in one or more organic, water-dilutable solvents.

22. The aqueous coating composition of claim 12, characterized in that component (III) is comprised of:

(III1) from 50 to 95% by weight, of water, (III2) from 5 to 45% by weight, of the binder component (I1) in water-dispersed form, optionally containing the novel polyurethane resin PUR (I11), (III3) from 2 to 10% by weight, of at least one neutralizing agent (I4), (III4) from 2 to 10% by weight, of at least one customary auxiliary and/or additive (III4), and (III5) from 0 to 10% by weight, of at least one emulsion polymer (III5), the sum of the proportions by weight of components (III1) to (III5) being in each case 100% by weight, based on (III).

23. The process of claim 15 wherein the coating composition is applied as a basecoat.

24. The process of claim 15 wherein the coating composition is applied as a topcoat.

25. The aqueous coating composition of claim 1, further comprising as further binders at least one of a polyacrylate resin PAC and a polyester resin PES.

26. The aqueous coating composition of claim 10, wherein the binder (I1) contains from 5 to 100% by weight based on the binder (I1) of the novel polyurethane resin PUR.

27. Coating compositions for the production of coatings which are resistant to condensed water, comprising a binder including a polyurethane resin PUR comprising alpha, omega-polymethacrylatediols (A) as structural units, and comprising as further binders at least one of a polyacrylate resin PAC and a polyester resin PES.

* * * * *